Figure 1:
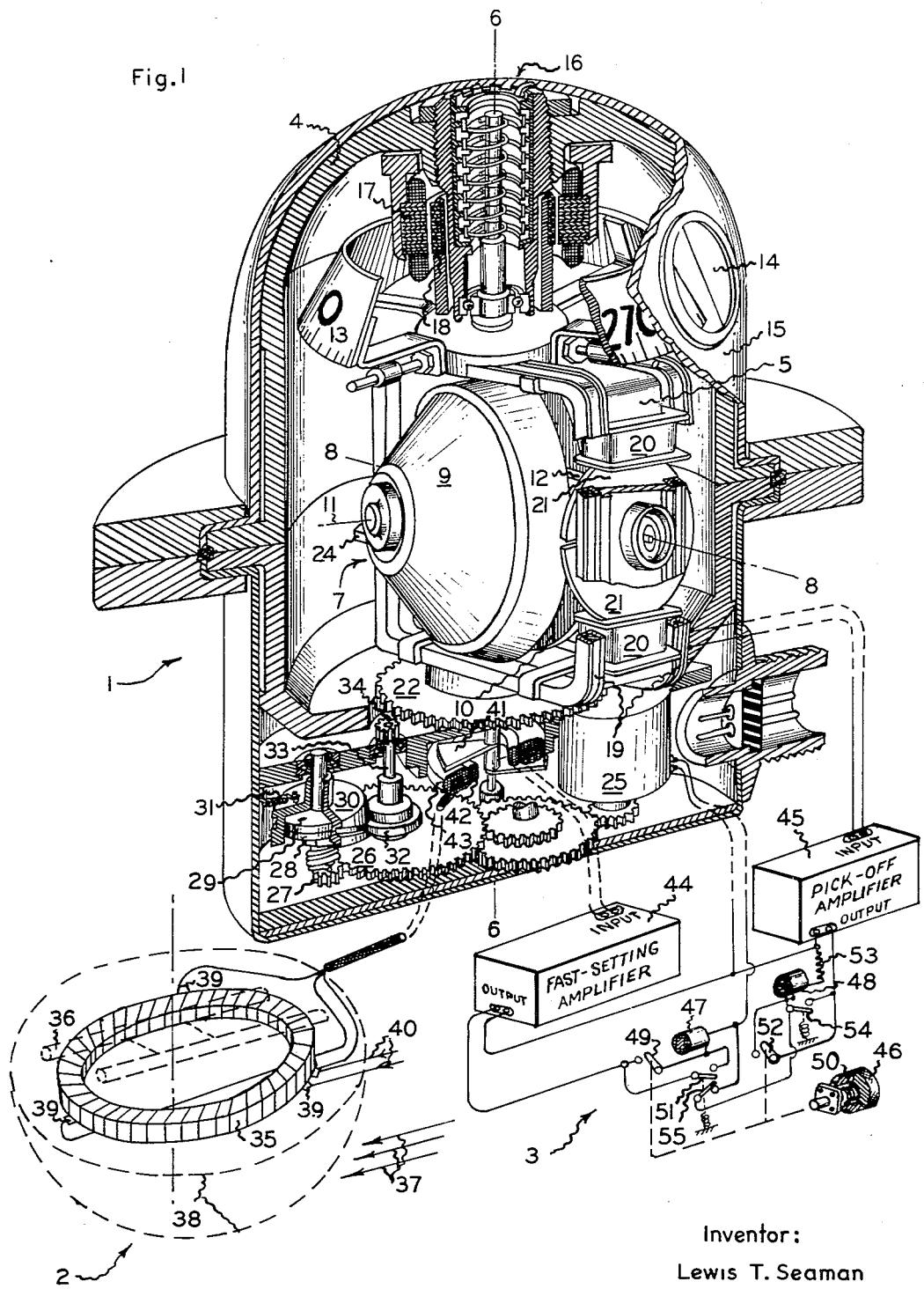

Inventor:
Lewis T. Seaman
by, Richard E. Horsley
His Attorney

May 22, 1956  L. T. SEAMAN  2,746,300
GYROSCOPE SETTING SYSTEM
Filed Dec. 21, 1954  3 Sheets-Sheet 3

Inventor:
Lewis T. Seaman
by, Richard E. Hosley
His Attorney

United States Patent Office 2,746,300
Patented May 22, 1956

2,746,300

GYROSCOPE SETTING SYSTEM

Lewis T. Seaman, Saugus, Mass., assignor to General Electric Company, a corporation of New York Application December 21, 1954, Serial No. 476,649

12 Claims. (Cl. 74—5.4)

The present invention relates to gyroscopes and, more particularly to gyroscopic apparatus which may be set automatically about both major and minor support axes.

As is well known, aircraft gyroscopes of the three-axis type are required to be oriented in their supports both accurately and rapidly when first placed in operation, when excessive drifts have occurred, and when certain violent maneuvers have been performed. Although many gyroscopes are slaved to other reference devices such as magnetic compasses and induction-type compasses or pendulums and liquid-level switches, the normal slaving influences are designed to be weak and do not satisfy the foregoing requirements. If it is sought to overcome this difficulty merely by amplifying the slaving torques, which torques must be impressed about the minor gyro axis, the minor axis torque motor assumes a size and weight which are intolerable in high-accuracy gyro instruments. In this connection it will be recognized that minor axis torque motors are mounted in part on the gyro rotor structure and in part on the main gyro gimbal, such that the weight, inertia, balancing, and current-consumption difficulties would result in undesirable precessions destroying instrument accuracies. Other approaches to the matter of securing rapid orientation of directional gyro spin axes have included: applying slaving torques about the major axes while the rotor structures were mechanically caged or locked with their main gimbals; and applying slaving torques about the major axes while the gyro rotors were not spinning or not spinning at substantial speeds. The disadvantages of caging and of limiting fast setting to intervals when the gyro rotors are not spinning are self-evident.

The present teachings, on the other hand, enable wholly automatic setting of slaved directional gyroscopes and slaved gyro verticals to their proper instantaneous azimuth or vertical orientations. Further, rotor structure levelling is automatically assured in the case of a directional gyroscope. These actions are secured with great precision and speed, and the setting operations may be readily initiated from remote positions. No caging apparatus is utilized, nor is it necessary to reduce or cease gyro rotor rotation during the brief setting intervals, and the apparatus used for the application of large precessing torques is so associated with the sensitive gyroscope components that its inertias, weight and frictions do not reduce instrument accuracies.

One object of the present invention is to provide novel and improved gyroscopic apparatus which may be set automatically, and with great accuracy and rapidity, into slaved correspondence with other reference devices.

Further, it is an object to provide slaved directional gyroscope systems in which the gyroscopes may be rapidly set both into azimuth correspondence with a separate azimuth reference and into a levelled condition.

In addition, it is an object to provide improved gyro vertical systems wherein erection to the vertical as sensed by other vertical references may be achieved quickly about both the roll and pitch axes.

By way of a summary account of one aspect of this invention, I utilize an azimuth reference device, such as a remote magnetic compass, together with a directional gyroscope arrangement of the type taught in the copending application of H. C. Wendt, Serial No. 465,523, filed October 29, 1954, for "Gyro Setting Apparatus," assigned to the same assignee as that of the present application. Such a gyroscope is equipped with mechanical stops which limit relative angular movement of its rotor structure and main gimbal about its normally horizontal minor gyro axis. These stops are positioned to engage only when the gyroscope assumes highly abnormal attitudes. Further, the directional gyroscope is provided with a minor-axis pick-off, an amplifier excited by the pick-off, and a high-torque device actuated by the amplifier output and disposed to impress large torques about the major gyro axis. When the gyroscope is to be set about both its support axes, the major-axis torque device is first caused to apply a torque in one direction about the major axis, whereupon the rotor structure precesses about the minor axis until the stops engage. Once the stops are struck, gyroscopic rigidity about the major axis is lost and the gyroscope can be turned freely about its major axis until the desired azimuth heading is reached. For the purpose of making this azimuth setting wholly automatic, rapid, and highly precise, I initially place the major axis torque device under the control of two devices, first, a remote magnetic compass, and, second, an electrical correspondence detector, the latter being sensitive to the orientations of the gyroscope about its own major axis. This control continues until the gyroscope is in exact correspondence with the magnetic compass, at which time the major axis torque is immediately reversed in direction. The reversed torque then causes precession of the gyro rotor structure to a levelled condition as sensed by the minor-axis pick-off, and the major axis torque device is thereafter rendered ineffective until subsequent fast setting is desired.

Figure 2:
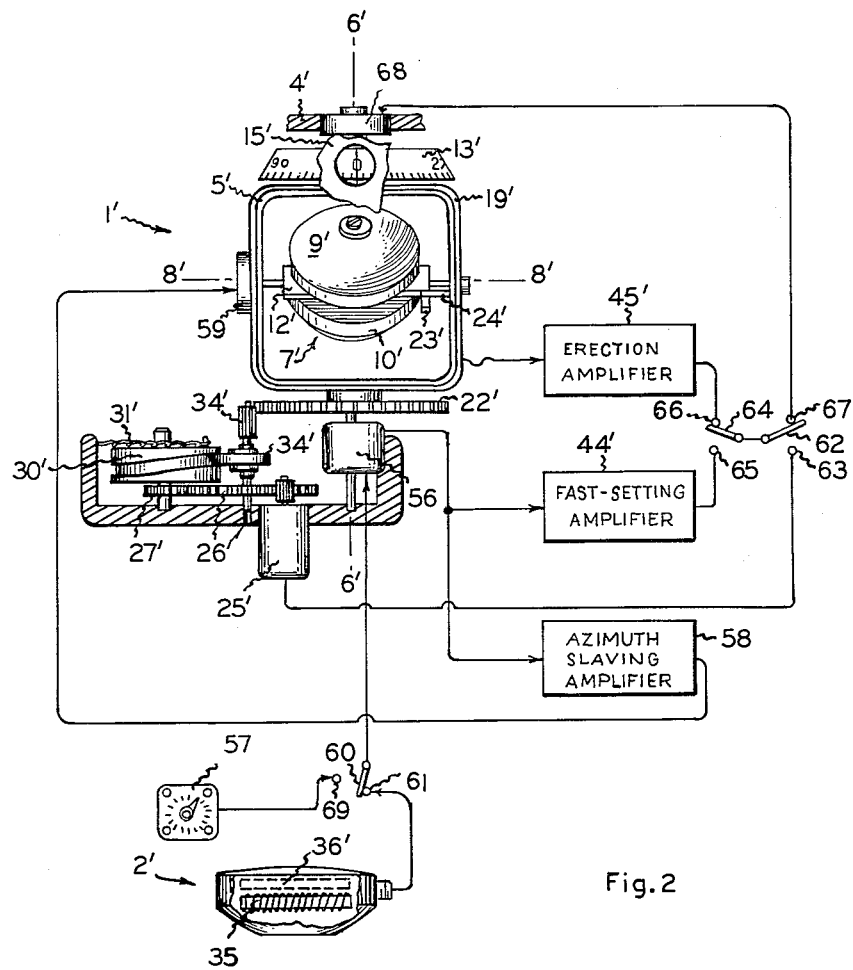
Figure 3:
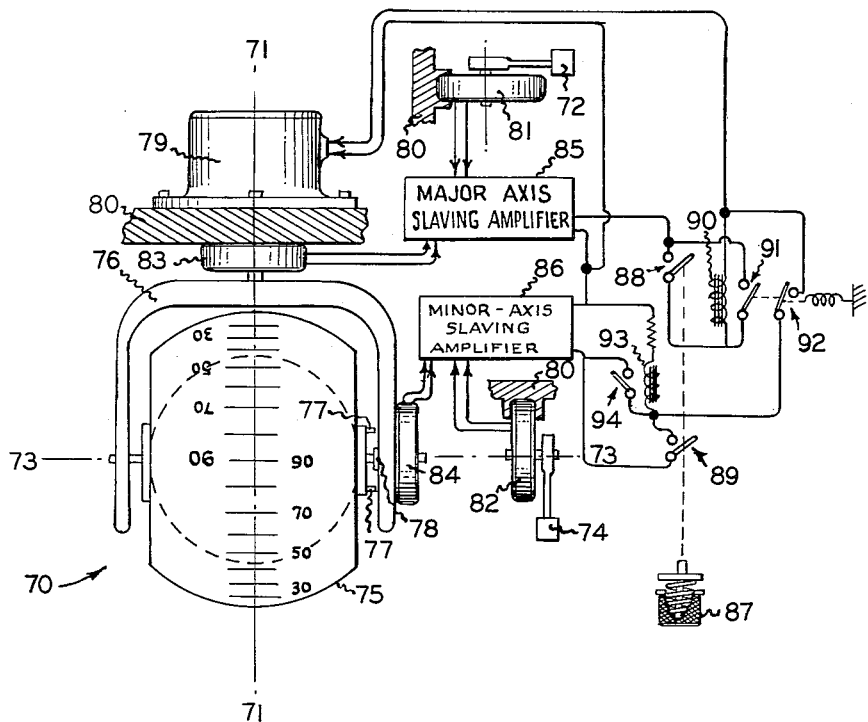
Figure 4:
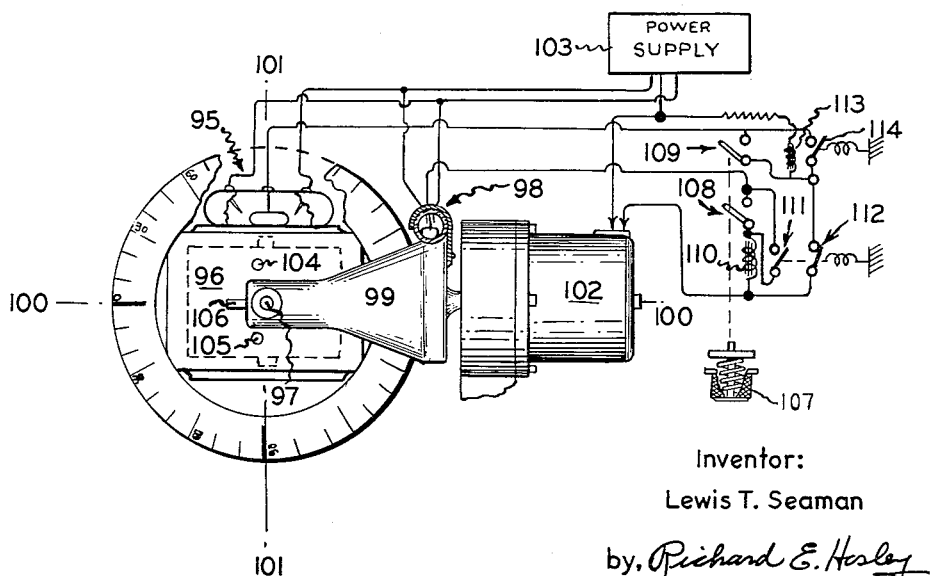

Although the features of this invention which are believed to be novel are set forth in the appended claims, the details of preferred embodiments and further objects and advantages may be most readily comprehended through reference to the following description taken in connection with the accompanying drawings, wherein:

Figure 1 illustrates a directional gyroscope system embracing the teachings of this invention;

Figure 2 provides a somewhat schematic showing of an improved directional gyroscope system;

Figures 3 shows a gyro vertical system slaved with independent reference pendulums; and Figure 4 illustrates an alternative gyro vertical system slaved with level detectors fixed with the gyroscope structure.

The apparatus of Figure 1 includes a three-axis azimuth or directional gyroscope 1, a remote compass 2, and associated control means 3. Gyroscope 1 is of the conventional type, in that an outer frame member 4 supports a main gimbal 5 for pivotal movement about a normally vertical major suspension axis 6—6, and the main gimbal 5 in turn pivotally supports a rotor structure 7 for pivotal movement about a normally horizontal minor suspension axis 8—8. In the particular construction illustrated, the rotor structure 7 includes twin symmetrical rotor halves 9 and 10 which revolve at high speed about the spin axis 11, the rotor halves being supported by a flat plate 12 passing between them and pivoted in the main gimbal 5 about minor axis 8—8. Rotor structures of this type are disclosed in the copending application of Harry C. Wendt, S. N. 325,577, filed December 12, 1952, for "Symmetrical Gyroscope," assigned to the same assignee as that of the present application. An azimuth card 13 is affixed to main gimbal 5, providing an indication of the gyro heading when viewed through the window 14 of the outer gyroscope housing 15. Spiral brush assembly 16 couples the movable gyroscope elements with stationary circuit elements, the brush assembly being like that of the copending application of Harry G. Swanson, S. N. 329,075, filed December 31, 1952, for "Gyro Slip Ring Structure," assigned to the same assignee as that of the present application. For the purpose of applying relatively low torques about the major axis 6—6 to accomplish normal levelling precession of rotor structure 7 about minor axis 8—8, there is provided an electromagnetic torque motor comprised of a stator 17, attached to the outer frame 4, and a rotor 18, fixed with main gimbal 5. Levelling errors or tilts of the rotor structure 7 about the minor axis 8—8 are detected by the minor axis pick-off arrangement comprising rotor structure 7 and windings 19 mounted on main gimbal 5. As is taught in the copending application of Harry C. Wendt, S. N. 331,096, filed January 13, 1953, for "Gyro Pick-Off," assigned to the same assignee as that of the present application, the leakage flux from rotor structure 7 will induce output signals in windings 19 which characterize tilts of the rotor structure from its normal position. When the pick-off signals are applied to a suitable levelling amplifier of the conventional type, and the amplifier output signals are fed to the stator 17 of the major axis torque motor, then the gyro rotor structure 7 will be maintained automatically in a predetermined relation to the main gimbal. Such small torques as may be required about the minor axis 8—8 for the purpose of precessing the main gimbal 5 into normal slaved azimuth correspondence with the earth's field detector 2 may be applied by the torque motor comprising windings 20 on main gimbal 5 cooperating with semicircular magnets 21 fixed with the rotor structure 7. A main gimbal gear 22 is also fixed with the gyroscope main gimbal 5 about the major axis 6—6.

Gimbal stops are provided to limit relative angular movements permissible between rotor structures 7 and main gimbal 5. Such stops may take the form of a pin 23 projecting from the rotor structure plate 12, and a pair of stop arms 24 fixed with main gimbal 5 (see Figure 2), and, preferably, the stops limit relative angular freedom of the main gimbal and rotor structure to between 160 and 180 degrees such that gimbal lock conditions are just avoided. High-angle stops of this type not only preclude the occurrence of gimbal lock but also insure that ambiguities in orientations of the main gimbal will be avoided despite violent maneuvering of the instrument, as is taught in the copending application of Allen T. Sinks, S. N. 594,628, filed May 19, 1945, for "Gyroscope," assigned to the same assignee as that of the present application.

For the purpose of applying high torques about the major axis 6—6, as is required for the rapid setting of the gyroscope about both its major and minor axes, there is added a major-axis torque-applying device which may be selectively coupled with and uncoupled from the gyro gimbal gear 22. This torque-applying device is illustrated in Figure 1 as that of the copending application of Harry G. Swanson, S. N. 471,352, filed November 26, 1954, for "Gyro Setting Device," assigned to the same assignee as that of the present application. Upon excitation of the reversible electric motor 25 for gyro setting purposes, the gear 26 drives the further gear 27 which is coupled with a spring-biased clutch disk 28. The second clutch disk 29 then rotates the externally-grooved cam 30 about half a turn, against restraint of a return spring 31, whereby the cam member 32 on shaft 33 is raised to engage the pinion 34 with gimbal gear 22. Torque from motor 25 is then applied through pinion 34, and rotation of the pinion may occur without disturbing the cam members because of the slippage afforded between clutch disks 28 and 29. Withdrawal of excitation from motor 25 relieves the torque-applying arrangement of drive torque, and spring 31 then turns cam 30 to its illustrated position. At the same time cam 32 and pinion 34 are moved downward and disengaged from gimbal gear 22.

The operating effects of the torque-applying arrangement are these: first, torque in one direction about major axis 6—6 causes gyro rotor structure 7 to precess about minor axis 8—8 until stops 23 and 24 engage; second, upon engagement of the stops, gyroscope rigidity about major axis 6—6 is lost and the main gimbal 5 turns freely in azimuth responsive to further torque in the one direction; and, third, application of torque in the reversed direction about major axis 6—6 then precesses the rotor structure 7 about minor axis 8—8 in a direction to disengage the stops and produce a levelling of the gyro rotor structure.

To the arrangement thus far described there is added the remote earth's field detector 2. That device may include only a core and coil combination 35 which responds to the earth's field directly, or it may further include a set of permanent magnets 36, shown in a dashed-line representation, which is pivoted to align itself with the earth's field. Lines of force such as those of the terrestrial magnetic field are designated by lines 37. Dashed lines 38 outline a suitable detector enclosure. One appropriate construction of the component 35 includes an annular core of saturable material upon which is placed a toroidal winding having polyphase electrical taps 39 and an alternating current electrical supply over lines 40. The patterns of voltage at taps 39 then characterize the orientation of the component 35 in field 37, or its orientation with reference to field 37 and the set of pivoted permanent magnets 36. Frame 4 of the gyroscope and component 35 of the earth's field detector are fixed in relation to one another.

A comparison of the azimuth orientation of the gyro main gimbal 5, about its major axis 6—6, with the azimuth orientation of the earth's field detector in the magnetic field 37 is secured through an electrical correspondence detector. That detector includes a rotor, fixed with the gyro main gimbal, and a stator fixed with the gyro outer frame. One suitable device includes a Z-shaped vaned rotor 41, an annular pick-off stator winding 42, and a further stator unit 43 comprising an annular core provided with a toroidal winding having polyphase taps interconnected with corresponding taps 39 of detector 2. In accordance with known principles, the correspondence detector pick-off winding 42 yields alternating current output signals which characterize in phase and amplitude the direction and extent of relative angular displacement between the heading of the main gimbal 5 and the heading of the earth's magnetic field. Thus, when the gyroscope is not properly oriented in azimuth, the winding 42 delivers an output signal to the fast-setting amplifier 44 with which it is coupled.

Output signals from the minor-axis pick-off windings 19 also characterize relative displacements of rotor structure 7 and main gimbal 5 from a null or levelled condition, as has been noted hereinbefore, and these signals are delivered to the pick-off amplifier 45.

The amplified output signals from the fast-setting amplifier 44 and pick-off amplifier 45 are employed to control automatically the fast settings in azimuth and levelling, respectively. In the apparatus of Figure 1, for example, it is merely necessary for the operator to press in the knob 46 momentarily, whereupon the gyroscope will then automatically set itself into accurate azimuth correspondence with the earth's field and will subsequently and automatically level itself, all within a matter of relatively few seconds. It is not necessary that the operator refer to the gyro compass card 13 or that he know of the orientation of the earth's field, or that he exercise any control during the setting operations.

One suitable automatic control circuit arrangement utilizes two holding-relay coils 47 and 48, a pair of manually-closed switches, and three sets of relay contacts. Switch blade 49, which closes with its associated contact when knob 46 is pressed inwardly, is in series with coupling between torque motor 25 and the fast-setting amplifier 44, as is the holding-relay coil 47, also. The switch closure is only a momentary one, because return spring 50 opens the switch contacts as soon as the button or knob 46 is released. However, the switch closure immediately occasions flow of current from amplifier 44 to motor 25 if there is a lack of azimuth correspondence between the gyro and compass, and relay coil 47 is then sufficiently excited to close its normally open switch 51. Thereafter, switch 51 preserves current flow in the amplifier-motor circuit because of its shunting relationship to switch 49. This current flow causes motor 25 and its associated apparatus to apply torque about the major gyro axis 6—6 until the stops 23 and 24 have struck and the main gimbal 5 has been turned in azimuth into accurate correspondence with the heading of the earth's field. When such correspondence occurs, the output winding 42 of the correspondence detector yields no output signal, amplifier 44 delivers no output, current flow to motor 25 ceases, and holding-relay switch 51 opens.

Immediately thereafter, the output of pick-off amplifier 45 is impressed upon the motor 25, to cause levelling of the gyro rotor structure 7 which at that moment is in a stop-engaged position about minor axis 8—8. This amplifier output signal will always be of phase proper to cause application of a reversed torque about axis 6—6 and to cause precession of the rotor structure back to a levelled condition during the setting operation. When knob 46 was first pressed inwardly, the switch 52 was closed by it momentarily. Switch 52 is serially coupled with the holding-relay coil 48 and a resistance 53, this series arrangement being connected across the output of amplifier 45. Inasmuch as the amplifier 45 invariably delivers an output under normally-expected conditions, momentary closure of switch 52 energizes relay coil 48 and closes its normally open switch 54, the latter switch 54 shunting switch 52. Coil 48 is thus kept energized and switch 54 kept closed. Application of the output of amplifier 45 to motor 25 is prevented during the first stage of setting controlled by the compass because the normally closed relay switch 55 is held open at such times. However, as soon as azimuth correspondence between the gyro and compass is had, the holding-relay coil 47 is de-energized and permits relay switch 55 to close and apply the output of amplifier 45 to motor 25 through relay switches 55 and 54. After the application of reversed torque to the gyroscope has levelled gyro rotor structure 7 to the critical null position, minor axis pick-off windings 19 yield no output signal. Failure of the pick-off output signal disables amplifier 45, de-energizes relay 48, and opens switch 54, such that the setting operation is complete and the gyroscope fully readied for use. Later automatic settings about both major and minor axes may be realized merely by pressing and releasing button 46.

In Figure 2 there is provided a somewhat more schematic representation of a directional gyroscope system employing my teachings. The simplified showings there of the directional gyroscope, remote compass, and fast-setting gyro torque device, and two of the amplifiers, bear identifying reference characters which are the same as those for corresponding elements in Figure 1, except that the like reference characters in Figure 2 are given prime accents. The system correspondence detector 56 may be of the Z-vane or another conventional type. Additional components include a heading selector or setting device 57, which may be a panel-mounted synchro manually operated by a knob to yield an output signal like that of the remote compass, a conventional azimuth slaving amplifier 58, and a minor-axis torque motor 59 which is employed for normal low-rate compass slaving. The wiring illustrations are of the single-line type, for simplicity.

When selector switch blade 60 is connected with its contact 61, the correspondence detector 56 yields a signal output which characterizes the difference, if any, between the azimuth headings of gyro main gimbal 5' and the earth's field as sensed by compass 2'. To accomplish fast azimuth slaving, switch blade 62 is connected with its contact 63 leading to the fast-setting torque device's reversible electric motor 25', and the switch blade 64 is first connected with its contact 65 for the purpose of coupling the output of the azimuth fast-setting amplifier 44' with motor 25'. In the manner hereinbefore described, the rotor structure 7' precesses about minor axis 8'—8', stops 23' and 24' engage, and the main gimbal 5' is then turned in azimuth about major axis 6'—6' until it reaches correspondence with the direction of the terrestrial lines of magnetic force. When the azimuth setting has been thus accomplished automatically, switch blade 64 is connected with its contact 66, while switch blade 62 remains engaged with its contact 63, such that minor-axis pick-off windings will then excite erection amplifier 45' to occasion reversed torque about major axis 6'—6' and a consequent levelling of rotor structure 7' about minor axis 8'—8'. The setting about both major and minor axes being complete at this point, the switch blade 64 will be left engaged with contact 66, and switch blade 62 will be connected with its contact 67. When this is done, the minor-axis pick-off winding 19' will excite amplifier 45' and the low-torque major-axis torque motor 68 to accomplish normal low-rate levelling. Because the fast-setting amplifier 44' is disabled during normal operating conditions, the azimuth slaving amplifier 58 cooperating with the usual low-torque minor-axis torque motor 59 will accomplish low-rate azimuth slaving of the gyro in the customary manner. Alternatively, rapid and accurate slaving to any preselected azimuth heading may be realized by placing the heading selector 57 in circuit with the correspondence detector 56, through closure of selector switch blade 60 with its contact 69.

Fast slaving of stopped gyroscopes with variable reference devices in accordance with these teachings also extends to apparatus other than directional gyroscopes, such as gyro vertical apparatus. For example, there is illustrated in Figure 3 a gyro vertical 70 which may be automatically slaved about its normally horizontal major suspension axis 71—71 with a major-axis pendulum 72, and slaved about its normally horizontal minor suspension axis 73—73 with a minor-axis pendulum 74. The gyroscope proper is of a conventional type which includes a rotor structure having a somewhat spherical indicator 75, a rotor assembly spinning about a normally vertical spin axis, a yoke-shaped main gimbal 76, and gimbal stops 77 and 78 on the rotor structure and main gimbal, respectively. A high-torque motor 79 is effective to apply the large torques required for setting of the gyroscope about both suspension axes.

Pendulum 72 detects the vertical about the major axis 71—71, or an axis parallel to the major axis, and translates its position relative to the instrument frame 80 into electrical signals by way of a signal generator 81. In like manner, signal generator 82 electrically characterizes the relation of the vertical-seeking minor-axis pendulum 74 to frame 80 about the minor axis 73—73 or an axis parallel to the minor axis. A major-axis signal generator 83 and minor-axis signal generator 84 are also associated with the gyroscope itself. Signal generators 81 and 83 together characterize the deviations of the main gimbal 76 from a horizontal or levelled position about the roll or major axis 71—71. If both of these generators 81 and 83 are the usual types of electrical pick-offs, the measured deviations can be translated into electrical signals by bucking the outputs of the pick-offs, as, for example, in the circuitry of the major-axis slaving amplifier 85. Alternatively, one of the signal generators 81 and 83 may be a conventional pick-off and the other a conventional electrical correspondence detector, such as a Z-vaned detector of the type described earlier, the two being appropriately interconnected to yield a deviation signal which is applied to amplifier 85. Minor-axis signal generators 82 and 84 may likewise be conventional pickoffs, or one may comprise an electrical correspondence detector. With either arrangement, the minor-axis slaving amplifier 86 responds to signals which characterize deviations of the gyro rotor structure from the true vertical about the minor or so-called "dive-and-climb" axis 73—73.

Through use of circuitry similar to that illustrated in Figure 1, the gyro vertical of Figure 3 is automatically and rapidly slaved with the true vertical detected by the dual pendulums, irrespective of the attitudes of the supporting aircraft. The settings in roll and dive-and-climb orientations are initiated by pressing the spring-biased button 87, whereby switches 88 and 89 are closed momentarily. Instantly, the output of major-axis slaving amplifier 85 is applied to the high-power major axis torque motor 79, and holding-relay coil 90 locks its normally open switch 91 in shunting relation to switch 88. The normally closed relay switch 92 is simultaneously held open. The gyro rotor structure then precesses until its stops 77 and 78 engage, and, subsequently, the gyro main gimbal 76 rotates about the roll axis 71—71 until the amplifier 85 no longer senses any deviation between gimbal 76 and its proper relation to the vertical as sensed by pendulum 72. Relay switches 91 and 92 then open and close, respectively. When switch 89 had earlier been closed momentarily the holding relay coil 93 had been energized by output of the minor-axis slaving amplifier 86 and had closed its normally open relay switch 94 which shunts switch 89. Thus, when relay switch 92 closes following the setting about the roll axis, the output of amplifier 86 is applied to major-axis torque motor 79, and reversed torque is exerted about the major axis. This reversed torque occasions precession of the rotor structure about the dive-and-climb axis 73—73 to the vertical as sensed by pendulum 74. Thereupon, amplifier 86 is disabled, and holding relay switch 94 opens. The gyro vertical is at that time fully set into correspondence with pendulums 72 and 74 about its roll and dive-and-climb axes.

Level-sensitive switches of small size and weight may be utilized with great advantage in place of pendulums. When these switches are mounted directly on the gyroscope, they serve as their own correspondence detectors; that is, they are responsive not only to gravity but also to their orientations on the movable gyroscope parts. Because of their dual response, it is not necessary that pickoffs or electrical correspondence detectors be used in conjunction with them. In Figure 4, my teachings are embraced in a gyro vertical arrangement which takes advantage of these characteristics of level-sensitive switches. My illustrations there are those of mercury-globule switches where in a small substantially cylindrical glass contains a mercury globule and a set of contacts which are disposed to close an external circuit when the globule is not in a null position as ascertained by true levelling of the tube. One such switch, 95, is mounted directly on the gyro rotor structure 96, responsive to tilting about the minor suspension axis 97. A second switch, 98, is mounted on the main gimbal 99, responsive to roll about the major suspension axis 100—100. The gyro spin axis 101—101 may be vertical, or may be slightly tilted for well known compensation purposes.

The fast-setting electric torque motor 102 mounted to apply large torques about the roll axis 100—100 is of a reversible type, such as one rotating in different directions responsive to excitation of different phases from a power supply 103. Gimbal stops which cooperate to enable fast setting are illustrated as comprising stop pins 104 and 105 on the gyro rotor structure 96, and a stop arm 106 on the main gimbal 99. When the gyroscope requires setting, button 107 is pressed momentarily, closing switches 108 and 109 for an instant. Because main gimbal 99 will be unlevelled when setting is desired, its associated level-switch 98 will be shorted, and power from supply 103 will flow through switch 108 and holding-relay coil 110 to the major axis torque motor 102. Normally open relay switch 111 then closes, shunting switch 108 and maintaining current flow to thorque motor 102 until rotor structure 96 has engaged its stops and until main gimbal 99 is accurately level and opens the contacts of its level-switch 98. Holding-relay coil 110 is then re-energized, whereupon the normally-closed relay switch 112 is closed and conducts current of an opposite phase to the torque motor 102 from power supply 103 through level-switch 95. Earlier, the closure of switch 109 had resulted in excitation of holding relay coil 113 and the closing of its switch 114 shunting switch 109, such that the dive-and-climb axis level-switch 95 is placed in control of the torque motor 102 during its reversed-torque operation. That reversed torque precesses gyro motor structure 96 about minor axis 97 until the level-switch 95 is in a level or null position wherein its contacts are open. Holding-relay coil 113 is then de-energized, its switch 114 opens, and the gyro vertical is found to be fully set to the vertical as detected by the level switches, all within a matter of relatively few seconds.

Both level-switches may be mounted on the gyro vertical rotor structure 96, of course, with comparable results, or both switches may be combined in one envelope, forming a so-called "two-axis" switch. As a further alternative, liquid switches of the type having enclosed gas bubbles may be used, rather than mercury globule switches. Also, in the control of directional gyroscopes, a level-switch or pendulum may be employed to ascertain that the last phase of the setting operation results in levelling of the gyro rotor structure to a true levelled condition. In this connection, it should be realized that a minor-axis pick-off for a directional gyro will merely control the gyro rotor structure precession such that it assumes a predetermined relationship to the main gyro gimbal, although that may be satisfactory in most systems.

Gimbal stop means limiting angular freedom of a gyroscope operating in accordance with these teachings may be dispensed with in those systems wherein the highest accuracies of settings are not required. In such unstopped gyroscopes, the rotor structures tend to remain in the so-called "gimbal lock" positions when precessed thereto, and gyroscopic rigidity about the major suspension axes is then lost, just as is the case when gimbal stops engage.

The specific embodiments of the invention herein disclosed are of a descriptive rather than a limiting nature, of course, and various changes, combinations, substitutions or modifications may be employed in accordance with these teachings without departing either in spirit or scope from this invention in its broader aspects.

What I claim as new and desire to secure by Letters Patent of the United States is:

1. A slaved gyroscope system comprising a gyro gimbal supported for movement about a major axis, a gyro rotor structure suspended by said gimbal for angular displacement in relation to said gimbal about a minor axis normal to said major axis, stop means limiting relative angular movement between said gyro rotor structure and said gimbal about said minor axis, torque means for applying torque about said major axis in two angular directions, an attitude reference device, means responsive to deviations between the attitude of said gimbal about said major axis and the attitude sensed by said reference device for actuating said torque means to apply torque about said major axis until said attitudes correspond, and means for reversing the direction of torque applied about said major axis by said torque means after the attitudes of said gimbal and reference device correspond.

2. A slaved gyroscope system comprising a gyro gimbal supported for movement about a major axis, a gyro rotor structure suspended by said gimbal for angular displacement in relation to said gimbal about a minor axis normal to said major axis, stop means limiting relative angular movement between said gyro rotor structure and said gimbal about said minor axis, torque means for applying torque about said major axis in two angular directions, an attitude reference device sensing attitude about said major axis, means responsive to deviations between the attitude of said gimbal and the attitude sensed by said reference device about said major axis for actuating said torque means to apply torque about said major axis until said attitudes correspond, means sensing angular orientations of said rotor structure about said minor axis, and means responsive to said sensing means for actuating said torque means to apply reversed torque about said major axis after said attitudes correspond and until said rotor structure precesses to a predetermined orientation about said minor axis.

3. A slaved gyroscope system comprising a gyro gimbal mounted for movement about a major axis, a gyro rotor structure suspended by said gimbal for angular displacement in relation to said gimbal about a minor axis normal to said major axis, stop means limiting relative angular movement between said gyro rotor structure and said gimbal about said minor axis, torque means for applying torque about said major axis in two angular directions, a first attitude reference device sensing attitudes about said major axis, means responsive to deviations between the attitude of said gimbal and the attitude sensed by said reference device about said major axis for actuating said torque means to apply torque about said major axis until said attitudes correspond, a second attitude reference device sensing attitudes about said minor axis, and means responsive to deviations between the attitude of said rotor structure and the attitude sensed by said second reference device about said minor axis for actuating said torque means to apply reversed torque about said major axis after said major axis attitudes correspond and until said minor axis attitudes correspond.

4. A slaved gyroscope system comprising a gyroscope having major and minor suspension axes, said gyroscope having gimbal stop means limiting angular freedom about said minor axis, torque motor means for exerting large torques in two angular directions about said major axis, non-gyroscopic attitude reference means for sensing attitude about said major axis, first means responsive to deviations between the attitude about said major axis sensed by said gyroscope and the attitude sensed by said reference means for actuating said torque motor means to apply torque about said major axis, second means for actuating said torque motor means to apply torque about said major axis which is reversed in relation to the direction of torque occasioned by said first means, and setting means for first coupling said torque motor means for actuation by said first means until said attitudes correspond and for next coupling said torque motor means for actuation by said second means.

5. A slaved gyroscope system comprising a gyroscope having major and minor suspension axes, said gyroscope having gimbal stop means limiting angular freedom about said minor axis, torque motor means for exerting large torques in two angular directions about said major axis, non-gyroscopic attitude reference means for sensing attitudes about said major and minor axes, first means responsive to deviations between the attitude about said major axis sensed by said gyroscope and the attitude sensed by said reference means for actuating said torque means to apply torque about said major axis, second means responsive to deviations between the attitude about said minor axis sensed by said gyroscope and the attitude about said minor axis sensed by said reference means for actuating said torque means to apply torque about said major axis, and setting means for first coupling said torque motor means for actuation by said first means until said attitudes about said major axis correspond and for next coupling said torque motor means for actuation by said second means until said attitudes about said minor axis correspond.

6. A slaved gyroscope system comprising a gyroscope having major and minor suspension axes, said gyroscope having gimbal stop means limiting angular freedom about said minor axis, torque motor means for exerting large torques in two angular directions about said major axis, non-gyroscopic reference means for sensing attitudes about said major axis, first means responsive to deviations between the attitude about said major axis sensed by said gyroscope and the attitude sensed by said reference means for actuating said torque motor means to apply torque about said major axis, gravity-responsive means for sensing attitudes with respect to the vertical about said minor axis, second means responsive to deviations between the attitude about said minor axis sensed by said gyroscope and the attitude about said minor axis sensed by said gravity-responsive means for actuating said torque motor means to apply torque about said major axis, and setting means for first coupling said torque motor means for actuation by said first means until said attitudes about said major axis correspond and for next coupling said torque motor means for actuation by said second means until said attitudes about said minor axis correspond.

7. A slaved directional gyroscope system comprising a directional gyroscope having a normally vertical major suspension axis and a normally horizontal minor suspension axis, said gyroscope having gimbal stop means limiting angular freedom about said minor axis, torque motor means for exerting large torques in two angular directions about said major axis, compass means for sensing azimuth heading with reference to the earth's field, first means responsive to deviations in the azimuth heading of said gyroscope about said major axis and the azimuth heading sensed by said compass means for actuating said torque motor means to apply torque about said major axis, pick-off means sensing displacements of said gyroscope from a predetermined orientation about said minor axis, second means responsive to said pick-off means for actuating said torque motor means to apply torque about said major axis, and setting means for first coupling said torque motor means for actuation by said first means until said azimuth attitudes of said gyroscope and compass correspond and for next coupling said torque motor means for actuation by said second means until said predetermined orientation about said minor axis is realized.

8. A slaved directional gyroscope system comprising a directional gyroscope having a normally vertical major suspension axis and a normally horizontal minor suspension axis, said gyroscope having gimbal stop means limiting angular freedom about said minor axis, torque motor means for exerting large torques in two angular directions about said major axis, compass means for sensing azimuth heading with reference to the earth's field, means comparing the azimuth heading of said gyroscope about said major axis with the azimuth heading sensed by said compass means and producing output signals characterizing differences in said headings, first means responsive to said signals for actuating said torque motor means to apply torque about said major axis, pick-off means producing output signals characterizing displacements of said gyroscope from a predetermined orientation about said minor axis, second means responsive to said pick-off output signals for actuating said torque motor means to apply torque about said major axis in directions to cause precession restoring said predetermined orientation, means for coupling said first means with said torque motor means, whereby said stop means are effective to interrupt gyroscopic rigidity about said major axis and said gyroscope turns about said major axis into azimuth correspondence with said compass means, and means for coupling said second means with said torque motor means, whereby said gyroscope precesses to said predetermined orientation about said minor axis.

9. A slaved directional gyroscope system comprising a directional gyroscope having a normally vertical major suspension axis and a normally horizontal minor suspension axis, said gyroscope having gimbal stop means limiting angular freedom about said minor axis, torque motor means for exerting large torques about said major axis, azimuth means independent of said gyroscope for establishing an azimuth heading, means comparing the azimuth heading of said gyroscope about said major axis with the azimuth heading established by said azimuth means and producing output signals characterizing differences in said headings, first means responsive to said signals for actuating said torque motor means to apply torque about said major axis, pick-off means producing output signals characterizing displacements of said gyroscope from a predetermined orientation about said minor axis, second means responsive to said pick-off output signals for actuating said torque motor means to apply torque about said major axis in directions to cause precession restoring said predetermined orientation, means for coupling said first means with said torque motor means, whereby said stop means are effective to interrupt gyroscopic rigidity about said major axis and said gyroscope turns about said major axis into azimuth correspondence with said azimuth means, and means for coupling said second means with said torque motor means, whereby said gyroscope precesses to said predetermined orientation about said minor axis.

10. A slaved directional gyroscope system comprising a directional gyroscope having a normally vertical major suspension axis and a normally horizontal minor suspension axis, said gyroscope having gimbal stop means limiting angular freedom about said minor axis, torque motor means for exerting large torques about said major axis, compass means for sensing azimuth heading with reference to the earth's field, means comparing the azimuth heading of said gyroscope about said major axis with the azimuth heading sensed by said compass means and producing output signals characterizing differences in said headings, first means responsive to said signals for actuating said torque motor means to apply torque about said major axis, whereby said stop means are effective to interrupt gyroscopic rigidity about said major axis and said gyroscope turns about said major axis into azimuth correspondence with said compass means, pick-off means producing output signals characterizing displacements of said gyroscope from a predetermined orientation about said minor axis, second means responsive to said pick-off output signals for actuating said torque motor means to apply torque about said major axis in directions to cause precessions restoring said predetermined orientation, and setting means actuatable first to couple said first means with said torque means until said azimuth headings correspond and next to couple said second means with said torque motor means automatically until said predetermined orientation is restored.

11. A slaved gyro vertical sytem comprising a gyro vertical having normally horizontal major and minor suspension axes, said gyro vertical having gimbal stop means limiting angular freedom about said minor axis, torque motor means for exerting large torques about said major axis, gravity-responsive means comparing the orientation of said gyro vertical about said major axis with the orientation of the vertical and providing output signals characterizing differences in said orientations, first means responsive to said signals for actuating said torque motor means to apply torque about said major axis, whereby said stop means are effective to interrupt gyroscopic rigidity about said major axis and said gyro vertical turns about said major axis until a predetermined orientation with respect to the vertical is realized about said major axis, means producing minor-axis output signals characterizing displacements of said gyro vertical from a predetermined orientation about said minor axis, second means responsive to said minor-axis output signals for actuating said torque motor means to apply torque about said major axis in directions to cause precessions restoring said gyro vertical to said predetermined orientation about said minor axis, and means for sequentially coupling said first means with said torque motor means and coupling said second means with said torque motor means.

12. A slaved gyro vertical system comprising a gyro vertical having normally horizontal major and minor suspension axes, said gyro vertical having gimbal stop means limiting angular freedom about said minor axis, torque motor means for exerting large torques about said major axis, first gravity-responsive means comparing the orientations of said gyro vertical about said major axis with the orientation of the vertical and providing said output signals characterizing differences in said orientations, first means responsive to said first signals for actuating said torque motor means to apply torque about said major axis, whereby said stop means are effective to interrupt gyroscopic rigidity about said major axis and said gyro vertical turns about said major axis until a predetermined orientation with respect to the vertical is realized about said major axis, second gravity-responsive means comparing the orientations of said gyro vertical about said minor axis with the orientation of the vertical and providing second output signals characterizing differences in said orientations, second means responsive to said second signals for actuating said torque motor means to apply torque about said major axis in directions to cause precessions restoring said gyro vertical to the vertical about said minor axis, and means for sequentially coupling said first actuating means with said torque motor means and coupling said second actuating means with said torque motor means.

References Cited in the file of this patent
UNITED STATES PATENTS

| | | |
|---|---|---|
| 2,452,473 | Kellogg | Oct. 26, 1948 |
| 2,524,756 | Braddon | Oct. 10, 1950 |
| 2,561,367 | Haskins | July 24, 1951 |
| 2,577,912 | Perkins | Dec. 11, 1951 |